C. E. WIESELGREEN.
INSULATED ROLLER BEARING
APPLICATION FILED JULY 18, 1914.

1,152,681.

Patented Sept. 7, 1915.

Witnesses:
J. L. Wallace
P. C. Richard.

Inventor:
Carl Emil Wieselgreen
By Attys.
Fraser, Turk & Myers

UNITED STATES PATENT OFFICE.

CARL EMIL WIESELGREEN, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

INSULATED ROLLER-BEARING.

1,152,681.  Specification of Letters Patent.  Patented Sept. 7, 1915.

Application filed July 18, 1914. Serial No. 851,698.

*To all whom it may concern:*

Be it known that I, CARL EMIL WIESELGREEN, a citizen of the Kingdom of Sweden, residing at Gottenborg, Sweden, have invented new and useful Improvements in Insulated Roller-Bearings, of which the following is a specification.

The invention relates to ball or roller bearings having electric insulation.

As is known, the leakage field passing through the bearings of electric machines frequently causes the generation of large currents which heat the bearings. If the rotor of such machines is journaled in ball bearings or roller bearings, the said short circuit currents have to pass the comparatively small contact surfaces between the balls or rollers and the rings of the bearings and cause on account of the great current density that the balls or rollers as well as the bearing rings are easily burnt so that the whole bearing may easily be destroyed. Also in other cases it may happen that strong electric currents pass through the bearings, as for instance the bearings of electric railway or tramway cars, such currents preventing in many cases the use of ball bearings.

The invention has for its object a special construction of the bearing by the aid of which the said inconveniences may be obviated and electrically insulated ball or roller bearings be manufactured as commercial units in the same manner as standard types of ball or roller bearings without causing troubles or requiring special arrangements when being mounted.

In order to attain this purpose the invention consists, chiefly, in this that one or both of the rings of the bearing which form tracks for the balls or rollers are composed of two (or more) concentric rings between which insulating material is provided.

Figure 1:
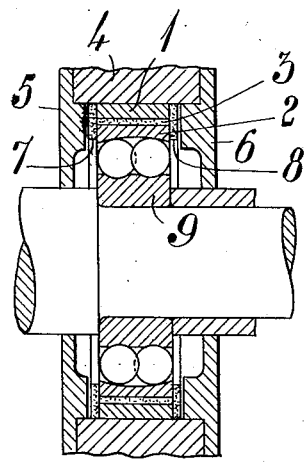
Figure 2:
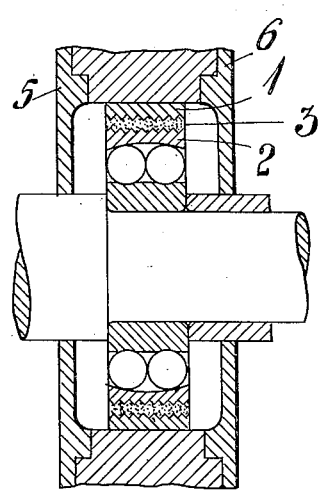
Figure 3:
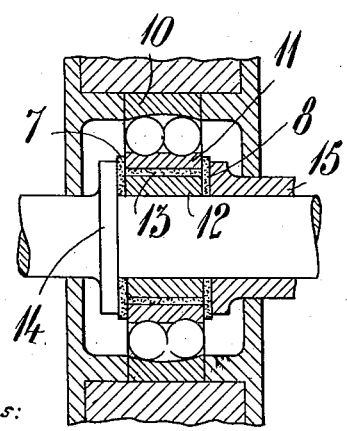
Figure 4:
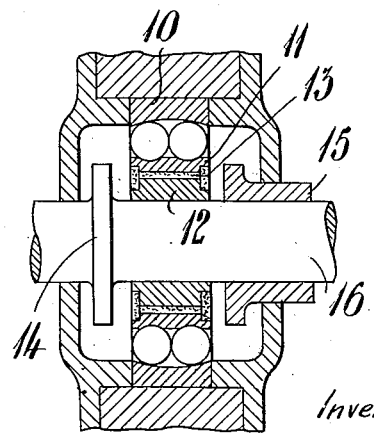

Several constructional forms of the invention are illustrated in the accompanying drawings in which:

Figures 1 and 2 show ball bearings provided with an insulated outer ring while Figs. 3 and 4 show ball bearings provided with an insulated inner ring.

Referring to Fig. 1, the outer ring of the ball bearing is composed of two concentric rings 1 and 2 between which is placed a layer 3 of insulating material preferably bonding said rings together. This insulation may consist of fiber, mica, ebonite or the like, or a plastic, hardening, insulating material may be used which is poured or pressed in between the rings 1, 2. The bearing shown in Fig. 1 is a so called guide bearing, *i. e.* a bearing which is fastened rigidly or with a slight play in the casing 4. It will be seen that one of the metal rings furnishes a track face for the balls, the other being provided with a plain bearing surface. For preventing electric short circuiting of both rings 1, 2 of such a bearing, in case, owing to an axial movement of the bearing in the casing, they should come into contact with one of the covering plates 5, 6 of the bearing, insulating plates 7, 8 are placed at each side of the rings 1, 2. The inner bearing ring 9 is of usual construction. As will be readily understood, the electric insulation used in the outer ring will prevent electric currents from passing through the balls and from destroying them or their track in the rings.

In the constructional form shown in Fig. 2 the surfaces of the rings 1, 2 which engage the insulation 3 are provided with annular grooves or threads for giving greater strength to the outer ring especially against axial pressing forces. In case the said surfaces are provided with annular grooves, as is indicated in the drawing, there is used a plastic, hardening, insulating material which is pressed in between both rings 1, 2, when properly adjusted in position relatively to each other. The bearing shown in Fig. 2 is a so called wandering bearing in which the inner ring is rigidly fastened to the shaft while the outer ring may move to a comparatively great extent in axial direction. Since in this construction the outer ring cannot come into contact with the covering plates 5, 6 of the casing, the insulating plates at the sides of the rings shown in Fig. 1 are omitted.

In the constructional form shown in Fig. 3 the outer ring 10 is constructed in the usual manner while the inner ring is composed of two concentric rings 11, 12 with insulation 13 inserted between them. Insulating plates 7, 8 insulate the end surfaces of the inner ring from the adjacent metal surfaces of the flange 14 of the shaft and of the fastening sleeve 15 in case the bearing, as is shown in the drawing, is mounted as a guide bearing.

The constructional form shown in Fig. 4 differs from that shown in Fig. 3 only in the different construction of the insulation 13. The insulating plates 7, 8 are in this case omitted, because of the outer ring 10 being rigidly fastened to the casing while the inner ring is movable axially on the shaft 16 to a comparatively great extent so that short circuiting of the rings 11, 12 on account of contact with the flange 14 of the shaft or the sleeve 15 cannot take place.

Although the invention is shown in the drawing as applied to ball bearings having two series of balls and a spherical track in the outer ring, it will be readily understood that it is not limited to said kind of bearings but may be applied to all kinds of ball or roller bearings.

Having thus described the invention what I claim is:

1. In bearings of the kind described, a track ring composed of a number of concentric, undivided rings, and an electric insulation between the said rings, substantially as and for the purpose set forth.

2. In a bearing, the combination with an inner and an outer track member, one of such members being composed of two metallic rings, and electric insulating material disposed between such rings.

3. In a self-contained bearing, the combination of an inner and an outer track member, one of said members being composed of a metallic ring having track faces for the rolling elements, a ring having a plain bearing surface, and electric insulating material disposed between said rings and bonding the same together.

In testimony that I claim the foregoing as my invention, I have signed my name in presence of two subscribing witnesses.

CARL EMIL WIESELGREEN.

Witnesses:
KARL RUNESKOG,
ERIC SWANSTRÖM.